(12) United States Patent
Sawada et al.

(10) Patent No.: US 7,035,029 B2
(45) Date of Patent: Apr. 25, 2006

(54) METHOD OF AND APPARATUS FOR RECORDING/READING INFORMATION, CIRCUIT FOR RECORDING/READING SIGNAL

(75) Inventors: Masaru Sawada, Kawasaki (JP); Toshihiko Morita, Kawasaki (JP); Takao Sugawara, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 10/776,748

(22) Filed: Feb. 11, 2004

(65) Prior Publication Data
US 2004/0179287 A1    Sep. 16, 2004

(30) Foreign Application Priority Data
Mar. 13, 2003   (JP)   ............... 2003-068270

(51) Int. Cl.
*G11B 5/09* (2006.01)

(52) U.S. Cl. ............... 360/51; 360/46; 360/48; 375/323; 375/325

(58) Field of Classification Search ............... 360/51
See application file for complete search history.

(56) References Cited

U.S. PATENT DOCUMENTS

| | | | | |
|---|---|---|---|---|
| 5,036,408 A | * | 7/1991 | Leis et al. ............... 360/48 |
| 5,422,763 A | * | 6/1995 | Harris ............... 360/51 |
| 5,475,540 A | * | 12/1995 | Gold ............... 360/48 |
| 5,881,037 A | * | 3/1999 | Tanaka et al. ............... 369/59.24 |
| 6,008,960 A | * | 12/1999 | Belser ............... 360/48 |
| 6,178,057 B1 | * | 1/2001 | Kuroda et al. ............... 360/51 |
| 6,295,176 B1 | * | 9/2001 | Reddy et al. ............... 360/48 |
| 6,456,671 B1 | * | 9/2002 | Patire ............... 375/325 |
| 6,530,060 B1 | * | 3/2003 | Vis et al. ............... 714/792 |
| 6,583,943 B1 | * | 6/2003 | Malone, Sr. ............... 360/48 |
| 6,594,094 B1 | * | 7/2003 | Rae et al. ............... 360/25 |
| 2003/0030930 A1 | * | 2/2003 | Sugawara et al. ............... 360/48 |

FOREIGN PATENT DOCUMENTS

| | | |
|---|---|---|
| JP | 2003-16734 | 1/2003 |
| JP | 2003016734 A * | 1/2003 |

\* cited by examiner

*Primary Examiner*—David Hudspeth
*Assistant Examiner*—Dismery Mercedes
(74) *Attorney, Agent, or Firm*—Greer, Burns & Crain, Ltd.

(57) ABSTRACT

An information recording/reading apparatus employs a preamble to reproduce a clock used when recording information in a recording medium and reads the information out of the recording medium at a timing synchronized with a read signal. The preamble is split and recorded by replacing a middle portion of the preamble with data and a sync byte. While a first buffer is employed to delay signal data read out of the recording medium, a frequency offset detector detects a frequency offset using the split preamble.

9 Claims, 8 Drawing Sheets

PRIOR ART

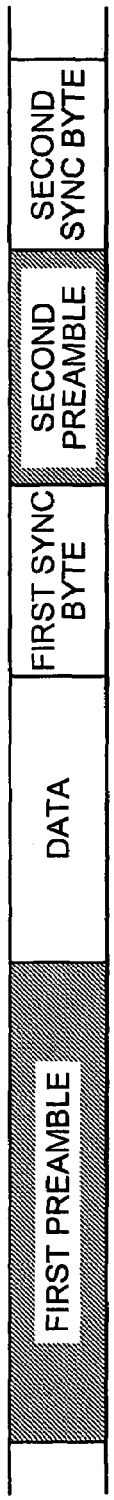
FIG.7A
FIG.7B

METHOD OF AND APPARATUS FOR RECORDING/READING INFORMATION, CIRCUIT FOR RECORDING/READING SIGNAL

BACKGROUND OF THE INVENTION

1) Field of the Invention

The present invention relates to a technology to reduce amount of timing reproduction data to enhance information recording density in an information recording/reading apparatus.

2) Description of the Related Art

An information recording/reading apparatus such as a magnetic disk drive is required to read out information from a recording medium at the same timing as that for recording the information in the recording medium. Specifically, the timings for recording and reading the information are required to have the same phase and cycle.

In the magnetic disk drive, a data reading section that reproduces the information recorded in the recording medium includes a timing reproducing mechanism for reproducing the timing that is used for recording the information (see, for example, Japanese Patent Application No. 2002-11018). FIG. 8 is a block diagram of a data reading unit including a conventional timing reproducing unit.

A head-read signal output from a head is converted into a digital signal through a variable gain amplifier (VGA) 50, a continuous time filter (CTF) 52 serving as a low-pass filter, and an analog-to-digital converter (ADC) 54. It is then subjected to waveform equalization through a finite impulse response (FIR) filter 56, and written in a buffer 62 as equalized signal data on a sector basis.

A gain controller 58 is employed to control gain of the VGA 50 to correct the head-read signal to a constant amplitude. The ADC 54 samples the head-read signal for generating a discrete signal using a clock from a clock generator 60 to convert it into a digital signal. The sampling clock from the clock generator 60 is a fixed clock that is not synchronous with the head-read signal.

When writing of a preamble at the leading potion of sector data is finished, reading of the sector data stored in the buffer 62 is started in order from leading data, and equalized signal data x is input to an FIR interpolating filter 64.

The buffer 62 delays the signal data output from the FIR filter 56 by a length of the preamble and supplies the delayed data to the FIR interpolating filter 64. In this case, the preamble corresponds to timing reproduction data for reproducing the recording timing, being cyclic waveform data.

The FIR interpolating filter 64, a Viterbi decoder 66, an error detector 76, a loop filter 74, and a digital accumulator 65 are looped to constitute a digital Phase Locked Loop (PLL). The digital PLL employs the preamble contained in the signal data delayed by the buffer 62 for frequency extraction and phase extraction.

The FIR interpolating filter 64 acts as a re-sampler for sampling in synchronization with a symbol rate. The Viterbi decoder 66 determines a correct signal y' using a Viterbi algorithm on the equalized signal y. A run length limited (RLL) decoder 68 outputs a RLL-decoded signal to a hard disk controller.

The error detector 76 detects a phase error between the output signal y from the FIR interpolating filter 64 and the correct signal y' determined by the Viterbi decoder 66. The detected phase error is integrated in the loop filter 74 and further integrated in the digital accumulator 65 to adjust the FIR interpolating filter 64 to match the fixed-clock-based sampling rate with the original symbol rate timing.

A phase offset detector 70 detects a phase offset (initial phase error) from the input preamble at the leading portion of the sector data output from the ADC 54, and presets the detected phase offset in the loop filter 74.

A frequency offset detector 72 detects a frequency offset (initial frequency error) from the input preamble at the leading portion of the sector data output from the ADC 54, and presets the detected frequency offset in the loop filter 74.

After the phase offset detector 70 presets the phase offset in the loop filter 74 and the frequency offset detector 72 presets the frequency offset in the loop filter 74, the FIR interpolating filter 64 starts reading of the sector data written in the buffer 62 in order from the leading portion thereof.

In synchronization with reading of the sector data out of the buffer 62, the digital PLL, including the error detector 76, the loop filter 74, the digital accumulator 65, and the FIR interpolating filter 64, operates for phase extraction and frequency extraction with respect to the preamble. Then, timing reproduction is performed with respect to the user data that follows the preamble such that the timing of the sampling signal at the sampling rate follows the timing of the correct clock at the symbol rate.

In order to detect the frequency offset accurately using the frequency offset detector 72, the preamble or timing reproduction data is required to have at least a predetermined length. Lengthening of timing reproduction data, however, causes a problem associated with decrease of the information recording area.

SUMMARY OF THE INVENTION

It is an object of the present invention to solve at least the problems in the conventional technology.

The information recording/reading apparatus that reads information from a recording medium at a timing synchronized with a read signal by reproducing a clock used when recording the information with timing reproduction data, according to one aspect of the present invention, includes a signal delay unit that delays signal data read from the recording medium for a predetermined time, the signal data having the timing reproduction data that is split and recorded in the recording medium by setting a middle portion of the timing reproduction data as an area for recording the information, and a frequency offset detecting unit that detects, during the predetermined time, a frequency offset that is a frequency difference between a clock of the read signal and an operation clock of the information recording/reading apparatus using the timing reproduction data that is split and recorded in the recording medium.

The information recording/reading circuit that reads information from a recording medium at a timing synchronized with a read signal by reproducing a clock used when recording the information with timing reproduction data, according to another aspect of the present invention, includes a signal delay circuit that delays signal data read from the recording medium for a predetermined time, the signal data having the timing reproduction data that is split and recorded in the recording medium by setting a middle portion of the timing reproduction data as an area for recording the information, and a frequency offset detecting circuit that detects, during the predetermined time, a frequency offset that is a frequency difference between a clock of the read signal and an operation clock of the information recording/reading circuit using the timing reproduction data that is split and recorded in the recording medium.

The information recording/reading method to read information from a recording medium at a timing synchronized with a read signal by reproducing a clock used when recording the information with timing reproduction data, according to still another aspect of the present invention, includes delaying signal data read from the recording medium for a predetermined time, the signal data having the timing reproduction data that is split and recorded in the recording medium by setting a middle portion of the timing reproduction data as an area for recording the information, and detecting, during the predetermined time, a frequency offset that is a frequency difference between a clock of the read signal and an operation clock of the information recording/reading apparatus using the timing reproduction data that is split and recorded in the recording medium.

The other objects, features, and advantages of the present invention are specifically set forth in or will become apparent from the following detailed descriptions of the invention when read in conjunction with the accompanying drawings.

BRIEF DESCRIPTION OF THE DRAWINGS

FIG. 7A and FIG. 7B are schematic diagrams of examples of different formats.

DETAILED DESCRIPTION

Exemplary embodiments of a method of and an apparatus for recording/reading information, a circuit for recording/reading signal, according to the present invention are explained in detail with reference to the accompanying drawings. Explanation of the present embodiments is for a magnetic disk drive to which the present invention is applied.

Figure 1A:
FIG. 1A to FIG. 1C are schematic diagrams for illustrating concept of frequency offset detection using a split preamble according to an embodiment of the present invention.
Figure 1B:
Figure 1C:
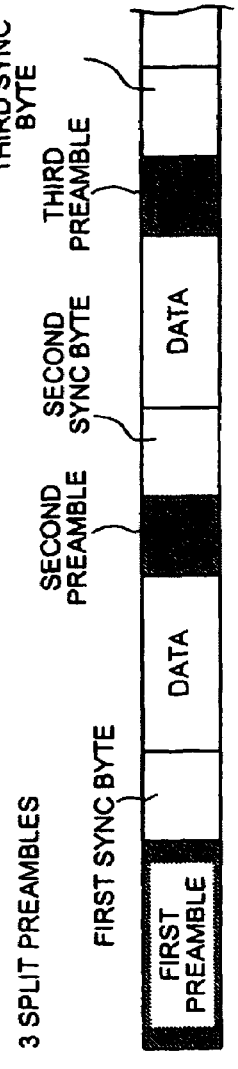

FIG. 1A to FIG. 1C are schematic diagrams for illustrating concept of frequency offset detection using a split preamble according to an embodiment of the present invention. FIG. 1A is a schematic diagram of a conventional sector format (non-split preamble). FIG. 1B is a schematic diagram of a sector format according to an embodiment of the present invention (2 split preambles). FIG. 1C is a schematic diagram of an extension of the sector format according to the embodiment (3 split preambles).

The conventional sector includes a preamble, a sync byte, and data arranged sequentially. The magnetic disk apparatus employs the preamble to reproduce the timing and employs the sync byte to recognize the starting position of the data prior to reading out the data.

In this embodiment, two preambles including a first preamble 11 and a second preamble 14 are arranged in each sector, and a first sync byte 12 and data 13 are arranged between the two preambles. In this case, the two preambles are formed when a middle portion of the conventional preamble is replaced with the first sync byte 12 and data 13.

The frequency offset can be detected from the preamble that has no preamble data in the middle portion like from the preamble that has a middle preamble portion. This is because the frequency offset can be derived from a difference between a phase difference of a waveform in the vicinity of the leading portion of the preamble to a reference waveform and a phase difference of a waveform in the vicinity of the ending portion of the preamble to the reference waveform. In this case, no waveform data is required in the middle portion of the preamble.

Thus, it is possible in this embodiment to reduce the area occupied by the preamble in the sector to derive the frequency offset with the same accuracy as in the case when the conventional preamble is employed. A longer interval between the two preambles may increase the difference between the phase difference in the vicinity of the leading portion of the preamble and the phase difference in the vicinity of the ending portion of the preamble. This is effective to improve the detection accuracy of the frequency offset without reducing the data recording capacity.

Furthermore, three or more preambles may be arranged in each sector, as shown in FIG. 1C. In such arrangement of plural preambles, the detection accuracy of the frequency offset can be improved in a method of deriving each frequency offset from any two preambles and averaging such frequency offsets.

Figure 2:
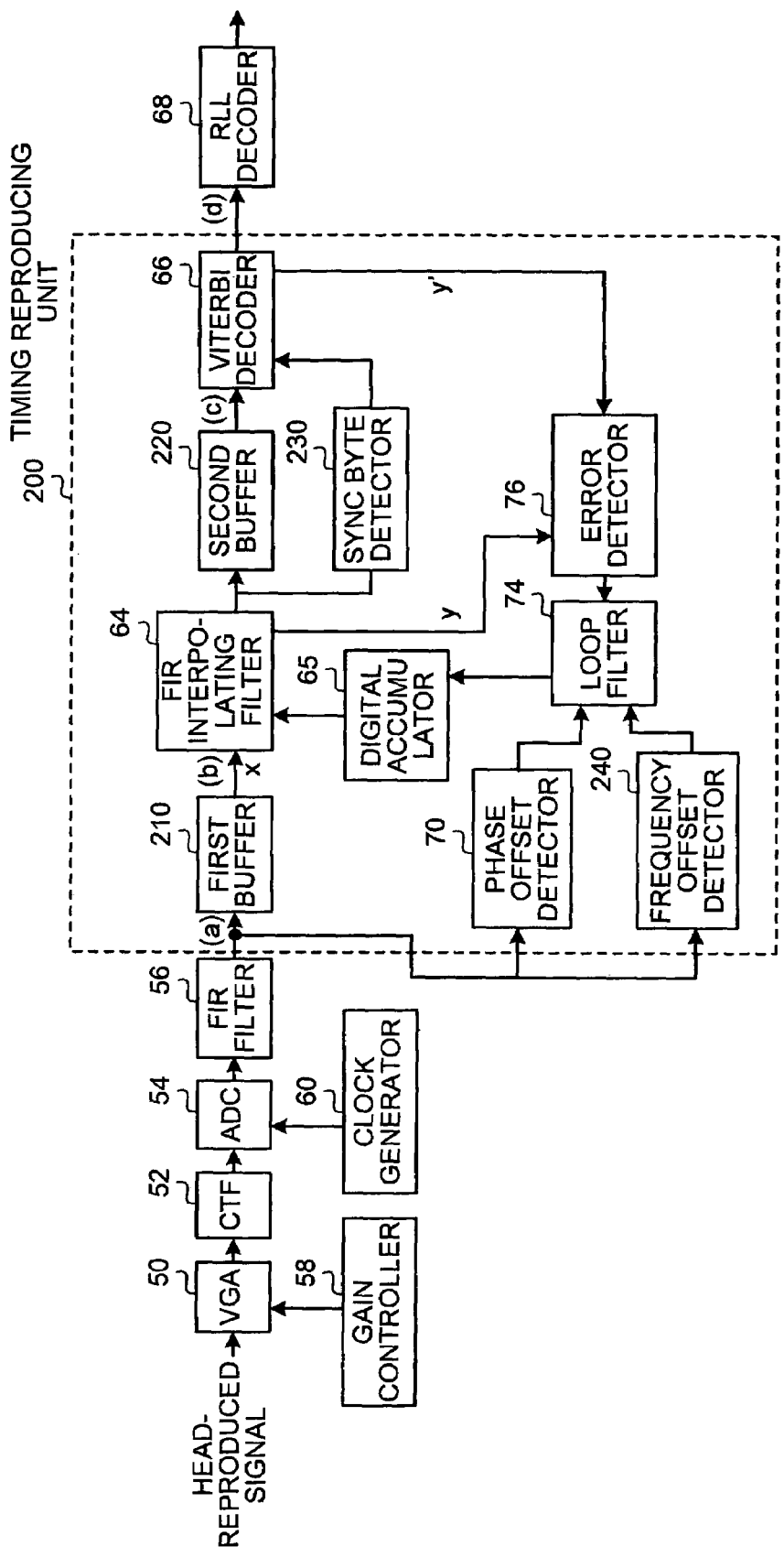
FIG. 2 is a block diagram of a data reading unit including a timing reproducing unit according to the embodiment.
Figure 8:
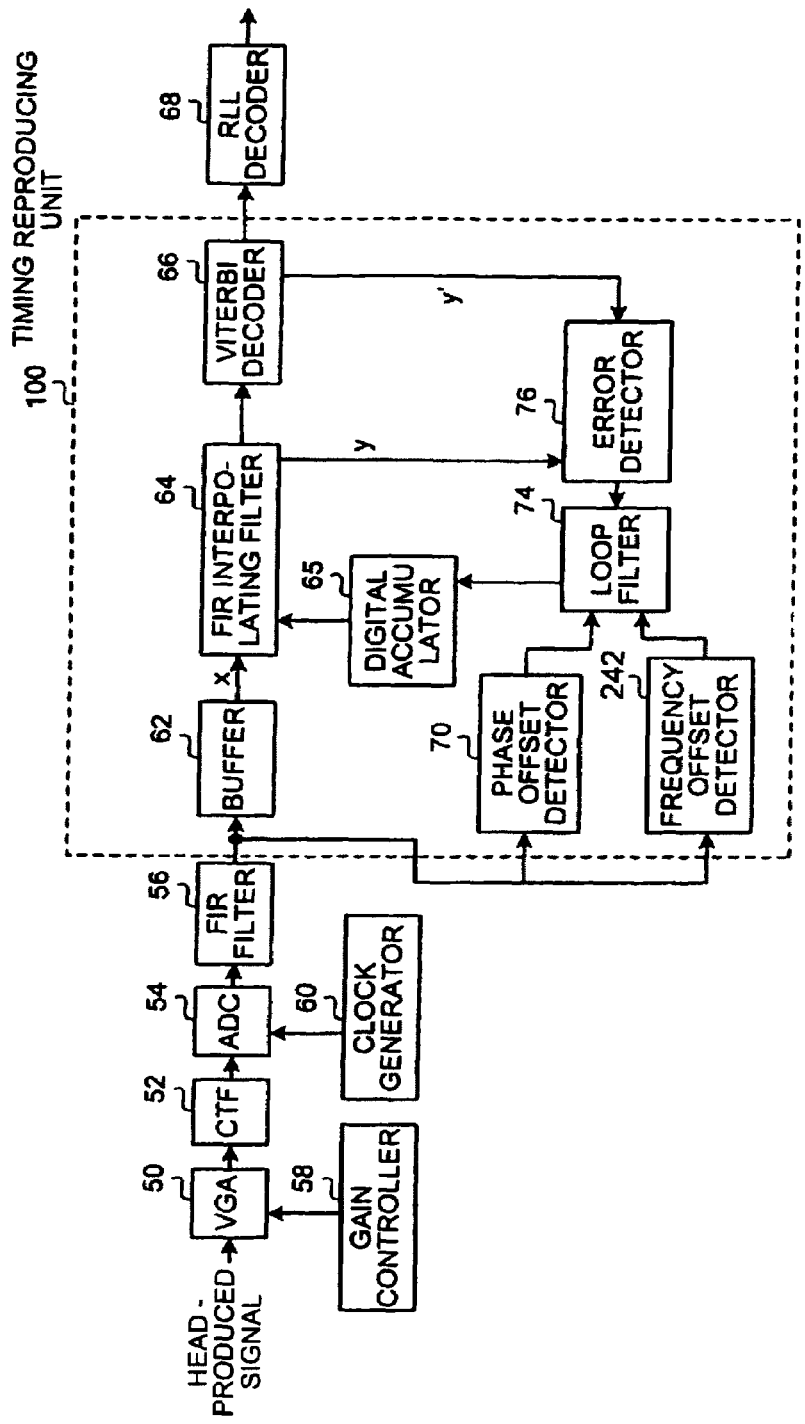
FIG. 8 is a block diagram of a data reading unit including a conventional timing reproducing unit.

FIG. 2 is a block diagram illustrating the configuration of the data reading unit including the timing reproducing unit according to the embodiment. The functional sections in FIG. 2 similarly serving as the parts illustrated in FIG. 8 are denoted with the same reference numerals and their detailed explanations are omitted herein for the convenience of explanation.

The timing reproducing unit 200 includes a first buffer 210, the FIR interpolating filter 64, the digital accumulator 65, a second buffer 220, a sync byte detector 230, the Viterbi decoder 66, the phase offset detector 70, a frequency offset detector 240, the loop filter 74, and the error detector 76.

The first buffer 210 serves as a storage for temporarily storing the signal data output from the FIR filter 56 by the length from the leading portion of the first preamble 11 to the ending portion of the second preamble 14. It delays the signal data output from the FIR filter 56 by the length of the first buffer 210 and sends the delayed signal data to the FIR interpolating filter 64.

During the delay, the phase offset detector 70 and the frequency offset detector 240 respectively detect the phase offset and the frequency offset, which are preset in the loop filter 74 to perform rapid timing reproduction in the timing reproducing unit 200.

The second buffer 220 serves as a storage for temporarily storing the signal data output from the FIR interpolating filter 64 by the length from the ending portion of the first sync byte 12 to the ending portion of the second sync byte 15. It delays the signal data output from the FIR interpolating filter 64 by the length of the second buffer 220 and sends the delayed signal data to the Viterbi decoder 66. During the delay, the Viterbi decoder 66 can process the data interposed between the preambles after the sync byte detector 230 detects the sync byte.

The sync byte detector 230 serves as a processor that recognizes the starting position of the data using the first sync byte 12 and the second sync byte 15 output from the FIR interpolating filter 64 and sends the recognized starting position to the Viterbi decoder 66. It processes the recognition while the second buffer 220 delays the signal data.

The frequency offset detector 240 serves as a processor that detects a frequency offset, which is preset in the loop filter 74. Different from the frequency offset detector 242 illustrated in FIG. 8, the frequency offset detector 240 detects the frequency offset using two split preambles.

Figure 3:
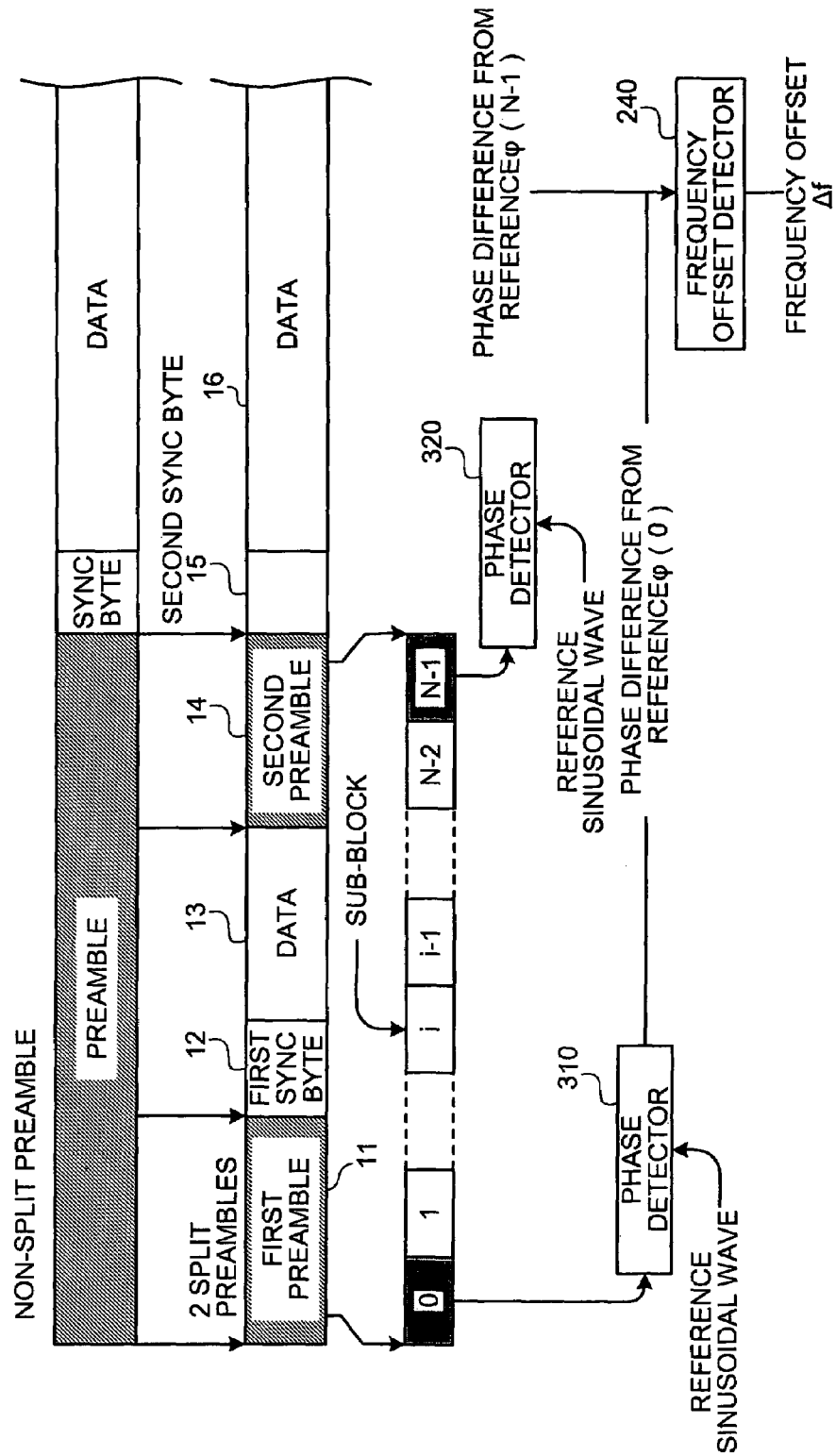
FIG. 3 is a schematic diagram for illustrating operation of a frequency offset detector.

FIG. 3 is a schematic diagram for illustrating operation of a frequency offset detector 240. The signal data from the first preamble 11 through the second preamble 14 is split into N sub-blocks, which are fed to phase difference detectors 310 and 320 in the phase offset detector 70 to detect phase differences from a reference sinusoidal wave. In this case, the phase difference detector 310 employs the signal data in the 0th sub-block to detect a phase difference $\phi(0)$ from the reference sinusoidal wave. The phase difference detector 320 employs the signal data in the $(N-1)^{th}$ sub-block to detect a phase difference $\phi(N-1)$ from the reference sinusoidal wave.

The frequency offset detector 240 derives a frequency offset $\Delta f$ from these phase differences $\phi(0)$ and $\phi(N-1)$ as:

$$\Delta f = (\phi(N-1) - \phi(0))/(N-1)$$

Thus, the frequency offset detector 240 detects a deviation in phase difference based on the phase difference $\phi(0)$ of the leading sub-block in the first preamble 11 and the phase difference $\phi(N-1)$ of the ending sub-block in the second preamble 14 to calculate a value of the frequency offset $\Delta f$.

Figure 4:
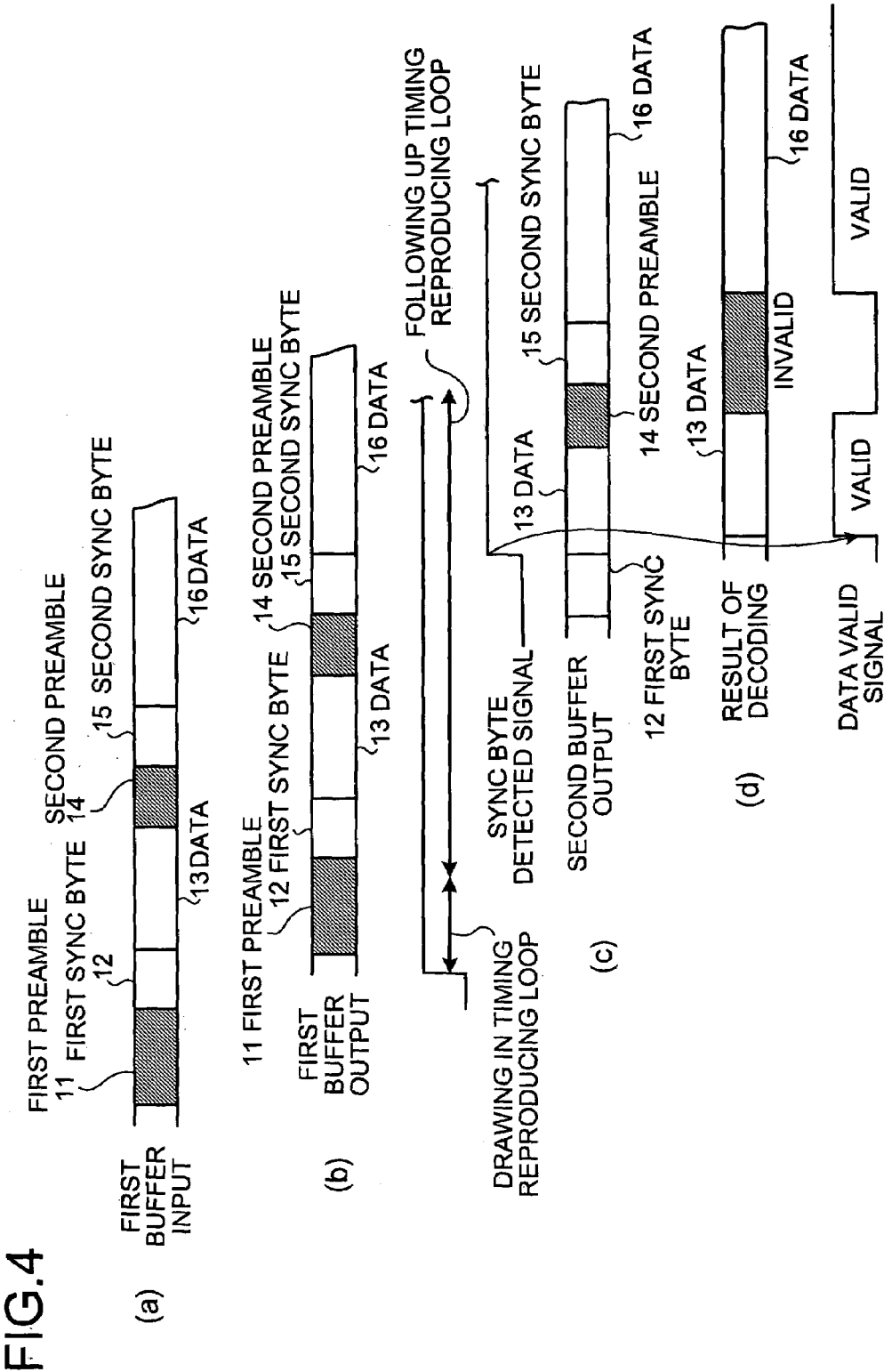
FIG. 4 is a timing chart for illustrating a timing reproduction according to the embodiment.

FIG. 4 is a timing chart for illustrating a timing reproduction according to the embodiment: (a) is the input to the first buffer 210; (b) is the output from the first buffer 210; (c) is the output from the second buffer 220; and (d) is a result of decoding by the Viterbi decoder 66.

As indicated by a difference in timing chart between (a) and (b), the first buffer 210 is employed to delay the signal data by the length from the leading portion of the first preamble 11 to the ending portion of the second preamble 14. During the delay, the phase offset detector 70 and the frequency offset detector 240 respectively detect the phase offset and the frequency offset, which are preset in the loop filter 74. The delayed signal data is then employed for extraction in a timing reproduction loop.

As indicated by a difference in timing chart between (b) and (c), the second buffer 220 is employed to delay the signal data by the length from the ending portion of the first sync byte 12 to the ending portion of the second sync byte 15. During the delay, the sync byte detector 230 detects the sync byte and raises a sync byte detected signal. The delayed signal data is then employed to decode the data.

When the first buffer 210 and the second buffer 220 are employed to delay the signal data, extraction in the timing reproduction loop can be performed after detection of the frequency offset. In addition, the data 13 interposed between the preambles can be decoded after detection of the starting position of the data.

Figure 5:
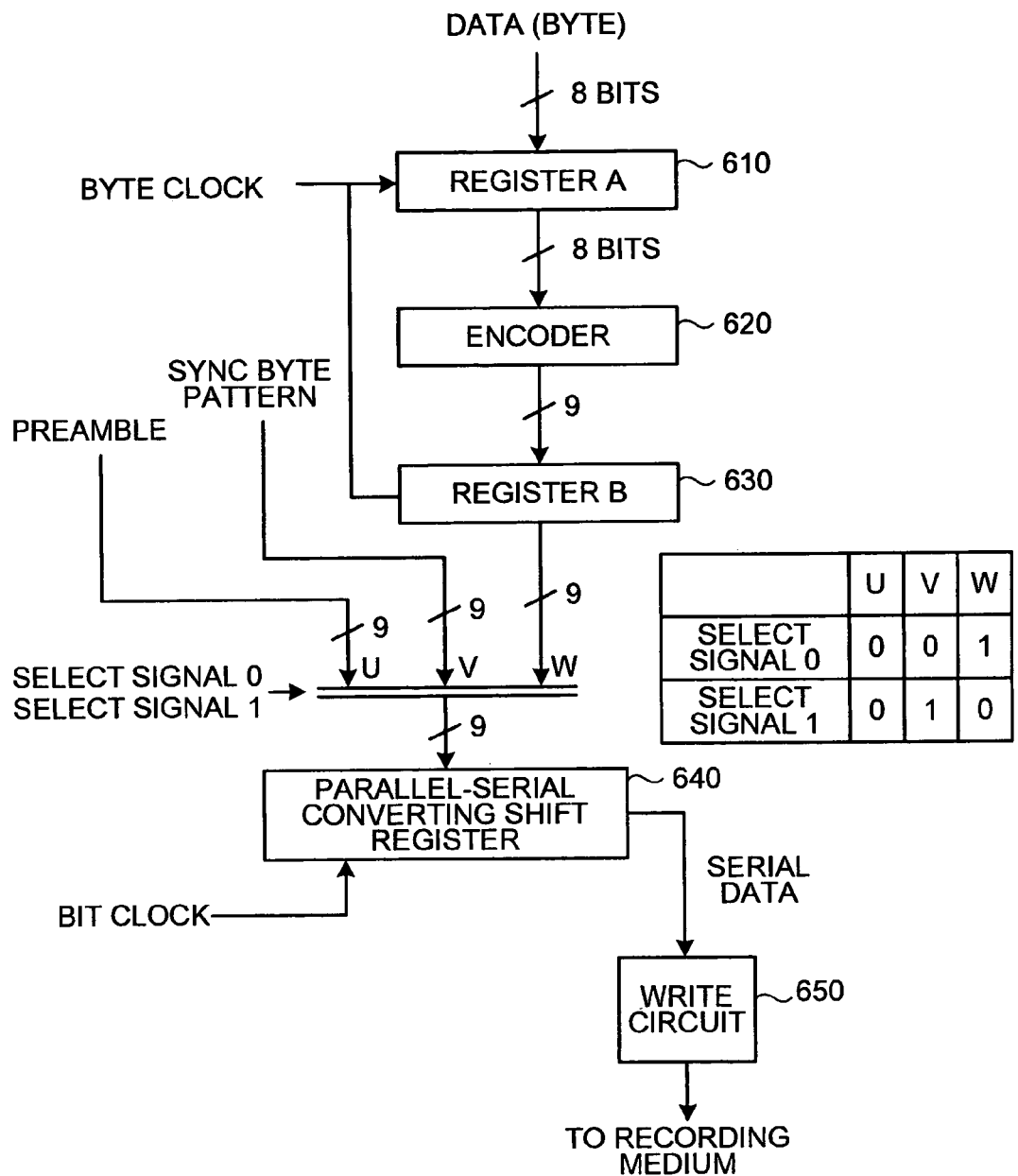
FIG. 5 is a block diagram of a recording circuit for recording the split preamble in a recording medium.

FIG. 5 is a block diagram of a recording circuit for recording the split preamble in a recording medium. This recording circuit may be provided in a read channel of the magnetic disk apparatus.

The data to be recorded in the recording medium is fetched on a byte basis from a register A610, then encoded at an encoder 620, and stored in a resistor B630. The data consists of 9 bits including an additional one bit increased during encoding.

The encoded 9-bit data, a 9-bit preamble and a 9-bit sync byte pattern are selected using a "select signal 0" and a "select signal 1". The selected 9-bit data is converted into serial data at a parallel-serial converting shift register 640. A write circuit 650 is employed to record the converted serial data in the recording medium.

Immediately before the encoded 9-bit data is converted into the serial data, the preambles and the sync byte pattern are appropriately selected and interposed to record the sector data including the split preambles in the recording medium.

Figure 6:
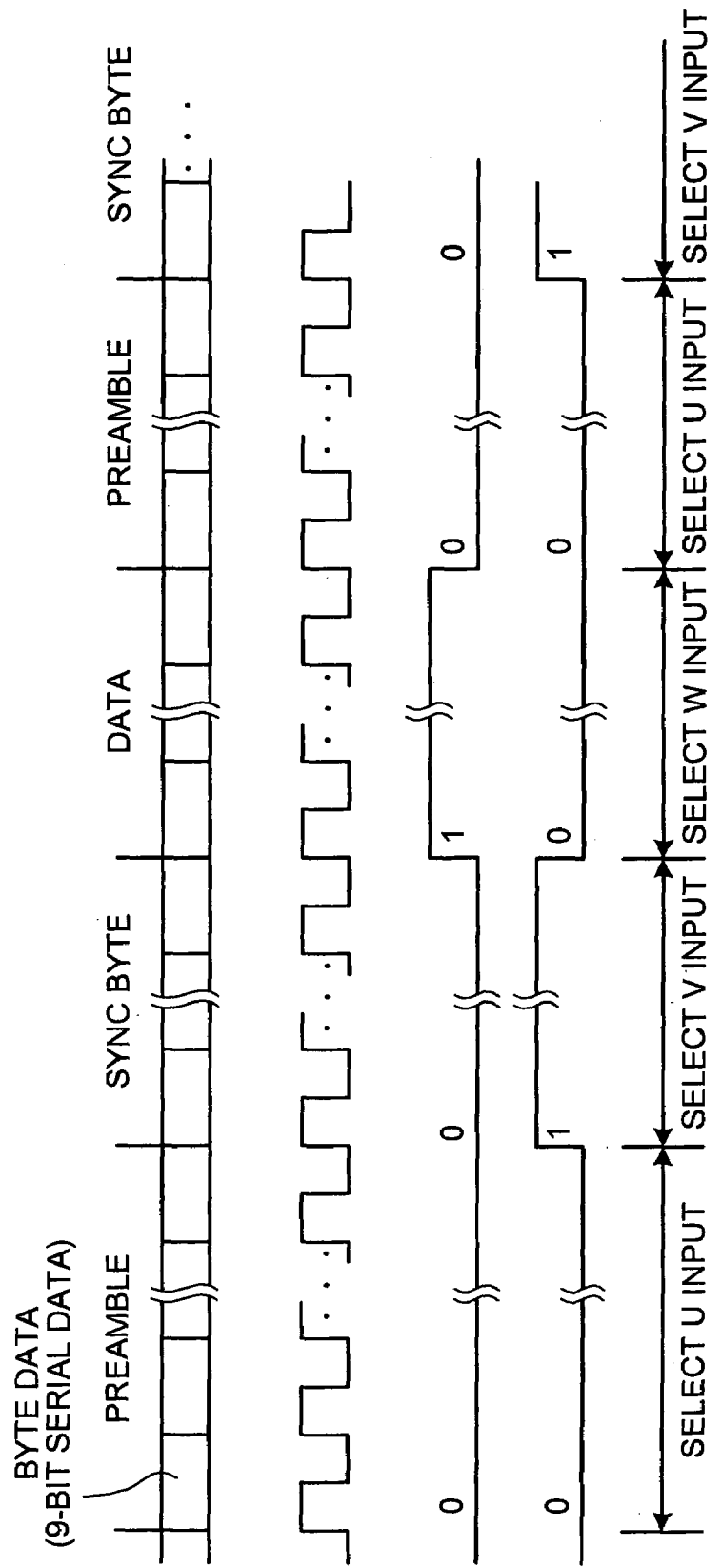
FIG. 6 is a timing chart for illustrating operational sequence of the recording circuit shown in FIG. 5.

FIG. 6 is a timing chart for illustrating operational sequence of the recording circuit shown in FIG. 5. If the "select signal 0" and the "select signal 1" are both equal to "0", U is selected to input the preamble to the parallel-serial converting shift register 640. If the "select signal 0" is equal to "0" and the "select signal 1" is equal to "1", V is selected to input the sync byte pattern. If the "select signal 0" is equal to "1" and the "select signal 1" is equal to "0", W is selected to input the data.

In the present embodiment, the middle portion of the preamble is replaced with the sync byte and the data to form split preambles. In addition, the frequency offset detector 240 employs the split preambles to detect the frequency offset. Therefore, it is possible to increase the data recording area and improve the recording density on the medium without lowering the accuracy of the frequency offset to be detected.

In the format shown in the present embodiment, the sync byte is arranged behind the preamble and the data is arranged behind the sync byte. The present invention is not limited to this format and is similarly applicable in other formats with the sync byte and the data arranged in different order.

FIG. 7A and FIG. 7B are schematic diagrams of examples of different formats. FIG. 7A is a format with the data arranged behind the first preamble and the first sync byte arranged behind the data. Also in this example with the first sync byte arranged behind the data, the buffer is employed to delay the signal data. Therefore, when the signal data is read out of the buffer, the starting position of the data can be recognized by reading the data from the ending portion of the buffer instead of reading the data from the leading portion of the buffer.

FIG. 7B is a format with the sync bytes arranged both before and behind the data. As the sync bytes are arranged before and behind the data, the starting position of the data can be recognized from the leading portion of the buffer as well as the ending portion of the buffer.

In the case explained in the present embodiment, the length from the first preamble 11 to the second preamble 14 is equal to the length of the conventional non-split preamble. The present invention is not limited to this example but is rather similarly applicable to the case where the length from the first preamble 11 to the second preamble 14 is longer or shorter than the length of the conventional non-split preamble.

For example, the longer the data 13 to be interposed between the first preamble 11 and the second preamble 14, the higher the detection accuracy of the frequency offset to be improved without lowering the information recording density.

According to the present invention, it is effective to reduce the amount of the timing reproduction data to enhance information recording density.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. An information recording/reading apparatus that reads information from a recording medium at a timing synchronized with a read signal by reproducing a clock used when recording the information with timing reproduction data, comprising:
   a signal delay unit that delays signal data read from the recording medium for a predetermined time, the signal data having timing reproduction data that is split and recorded in the recording medium by setting a middle portion of the timing reproduction data as an area for recording the information; and
   a frequency offset detecting unit that detects, during the predetermined time, a frequency offset that is a frequency difference between a clock of the read signal and an operation clock of the information recording/reading apparatus using the timing reproduction data that is split and recorded in the recording medium;
   wherein the timing reproduction data is cyclic waveform data divided into a plurality of blocks,
   a phase of the timing reproduction data that is split and recorded in the recording medium is continuous, and
   the frequency offset detecting unit detects the frequency offset based on a difference between a phase difference of a cyclic waveform of a leading block from a reference waveform and a phase difference of a cyclic waveform of an ending block from the reference waveform.

2. The information recording/reading apparatus according to of claim 1, further comprising:
   a recording unit that splits the timing reproduction data and records the timing reproduction data split in the recording medium.

3. The information recording/reading apparatus according to claim 1, wherein sync data for recognizing a leading position of the information and the information are recorded between the timing reproduction data that is split and recorded in the recording medium.

4. An information recording/reading circuit that reads information from a recording medium at a timing synchronized with a read signal by reproducing a clock used when recording the information with timing reproduction data, comprising:
   a signal delay circuit that delays signal data read from the recording medium for a predetermined time, the signal data having the timing reproduction data that is split and recorded in the recording medium by setting a middle portion of the timing reproduction data as an area for recording the information; and
   a frequency offset detecting circuit that detects, during the predetermined time, a frequency offset that is a frequency difference between a clock of the read signal and an operation clock of the information recording/reading circuit using the timing reproduction data that is split and recorded in the recording medium;
   wherein the timing reproduction data is cyclic waveform data divided into a plurality of blocks,
   a phase of the timing reproduction data that is split and recorded in the recording medium is continuous; and
   the frequency offset detecting unit detects the frequency offset based on a difference between a phase difference of a cyclic waveform of a leading block from a reference waveform and a phase difference of a cyclic waveform of an ending block from the reference waveform.

5. The information recording/reading circuit according to of claim 4, further comprising:
   a recording circuit that splits the timing reproduction data and records the timing reproduction data split in the recording medium.

6. The information recording/reading circuit according to claim 4, wherein sync data for recognizing a leading position of the information and the information are recorded between the timing reproduction data that is split and recorded in the recording medium.

7. An information recording/reading method to read information from a recording medium at a timing synchronized with a read signal by reproducing a clock used when recording the information with timing reproduction data, comprising:
   delaying signal data read from the recording medium for a predetermined time, the signal data having the timing reproduction data that is split and recorded in the recording medium by setting a middle portion of the timing reproduction data as an area for recording the information; and
   detecting, during the predetermined time, a frequency offset that is a frequency difference between a clock of the read signal and an operation clock of the information recording/reading apparatus using the timing reproduction data that is split and recorded in the recording medium;
   wherein the timing reproduction data is cyclic waveform data divided into a plurality of blocks,
   a phase of the timing reproduction data that is split and recorded in the recording medium is continuous; and
   the frequency offset detecting unit detects the frequency offset based on a difference between a phase difference of a cyclic waveform of a leading block from a reference waveform and a phase difference of a cyclic waveform of an ending block from the reference waveform.

8. The information recording/reading method according to of claim 7, further comprising:
   splitting the timing reproduction data; and
   recording the timing reproduction data split in the recording medium.

9. The information recording/reading method according to claim 7, wherein sync data for recognizing a leading position of the information and the information are recorded between the timing reproduction data that is split and recorded in the recording medium.

* * * * *